(12) United States Patent
Shirani et al.

(10) Patent No.: US 10,487,608 B2
(45) Date of Patent: Nov. 26, 2019

(54) SUBSEA FLOWMETER CONNECTOR ASSEMBLY

(71) Applicant: OneSubsea IP UK Limited, London (GB)

(72) Inventors: Alireza Shirani, Houston, TX (US);
Marcus Lara, Cypress, TX (US);
Akshay Kalia, Houston, TX (US);
Gustavo Gonzalez, Cypress, TX (US);
Randy Kimberling, Houston, TX (US)

(73) Assignee: OneSubsea IP UK Limited, London (GB)

(*) Notice: Subject to any disclaimer, the term of this patent is extended or adjusted under 35 U.S.C. 154(b) by 0 days.

(21) Appl. No.: 15/591,318

(22) Filed: May 10, 2017

(65) Prior Publication Data

US 2017/0328163 A1    Nov. 16, 2017

Related U.S. Application Data

(60) Provisional application No. 62/334,870, filed on May 11, 2016.

(51) Int. Cl.

| | | |
|---|---|---|
| *E21B 33/038* | (2006.01) | |
| *E21B 43/017* | (2006.01) | |
| *E21B 47/00* | (2012.01) | |
| *E21B 47/10* | (2012.01) | |
| *G01F 15/18* | (2006.01) | |

(Continued)

(52) U.S. Cl.
CPC ........ *E21B 33/038* (2013.01); *E21B 41/0007* (2013.01); *E21B 43/017* (2013.01); *E21B 43/12* (2013.01); *E21B 47/0001* (2013.01); *E21B 47/10* (2013.01); *G01F 15/18* (2013.01)

(58) Field of Classification Search
CPC ...... G01F 15/18; E21B 33/038; E21B 43/017; E21B 47/0001; E21B 47/10
See application file for complete search history.

(56) References Cited

U.S. PATENT DOCUMENTS 3,401,746 A * 9/1968 Stevens ................... E21B 35/00
166/352
3,504,741 A * 4/1970 Talley, Jr. ............. E21B 43/017
166/267

(Continued)

FOREIGN PATENT DOCUMENTS

| GB | 2347183 A | 8/2000 | |
|---|---|---|---|
| WO | 2010129178 A2 | 11/2010 | |
| WO | WO-2011119479 A1 * | 9/2011 | ........... E21B 43/017 |

OTHER PUBLICATIONS

Yong Bai and Qiang Bai, Subsea Engineering Handbook, Gulf Professional Publishing (2010), pp. 853-890 (Year: 2010).*

(Continued)

*Primary Examiner* — James G Sayre
(74) *Attorney, Agent, or Firm* — Brandon S. Clark

(57) ABSTRACT

A subsea connector assembly with flowmeter incorporated therein. The assembly is particularly configured for securing a flexible flowline at subsea production managing hardware such as at a manifold at a seabed or Christmas tree at a well head. Incorporating a flowmeter into the connector as opposed to such comparatively larger scale hardware ultimately saves substantial material, transport, installation, footspace and other costs.

17 Claims, 5 Drawing Sheets

(51) Int. Cl.
*E21B 41/00* (2006.01)
*E21B 43/12* (2006.01)

(56) References Cited

U.S. PATENT DOCUMENTS

| | | | | |
|---|---|---|---|---|
| 4,820,083 A * | 4/1989 | Hall | ............... | E21B 43/013 166/347 |
| 6,763,889 B2 * | 7/2004 | Rytlewski | ............... | B63G 8/001 166/338 |
| 2003/0145998 A1 * | 8/2003 | Langford | ............... | B01D 17/0211 166/350 |
| 2008/0245529 A1 * | 10/2008 | Christie | ............... | E21B 33/035 166/368 |
| 2008/0257032 A1 * | 10/2008 | Zollo | ............... | E21B 33/03 73/152.29 |
| 2010/0025034 A1 * | 2/2010 | Donald | ............... | E21B 33/035 166/267 |
| 2012/0273213 A1 * | 11/2012 | Blalock | ............... | E21B 33/038 166/341 |
| 2013/0206420 A1 | 8/2013 | McHugh et al. | | |
| 2014/0262306 A1 * | 9/2014 | Hosie | ............... | E21B 33/038 166/336 |

OTHER PUBLICATIONS

Extended European Search Report issued in European Patent Application No. 17170678.1 dated Dec. 4, 2017; 8 pages.

\* cited by examiner

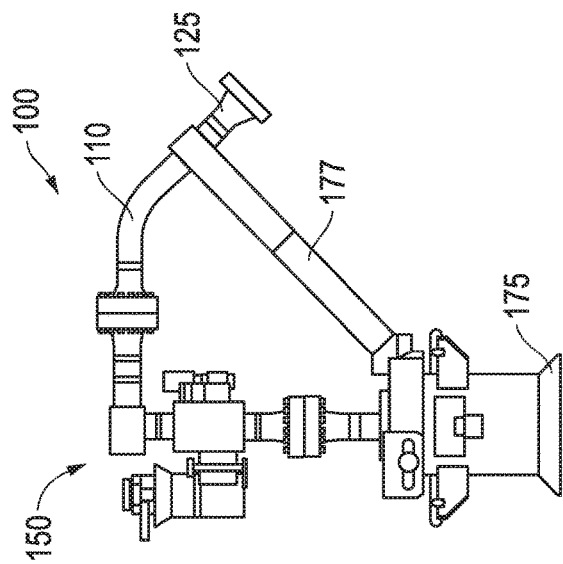
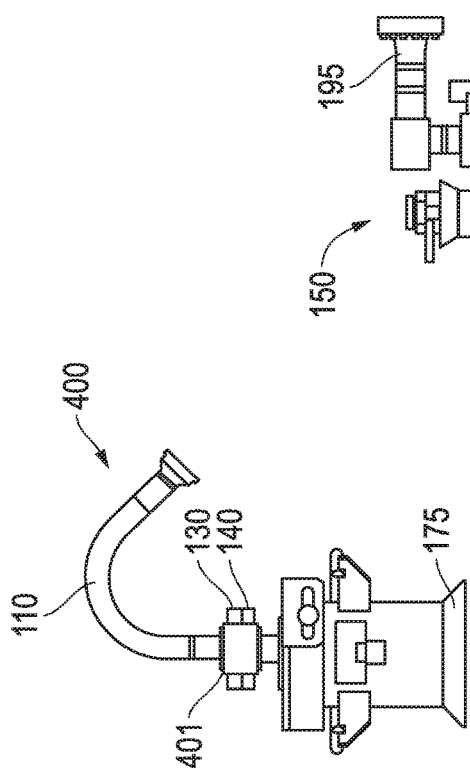
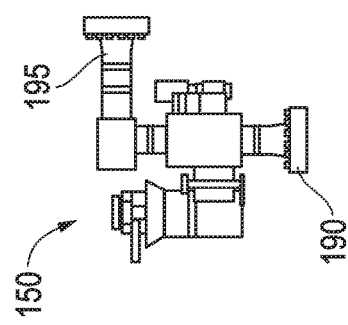
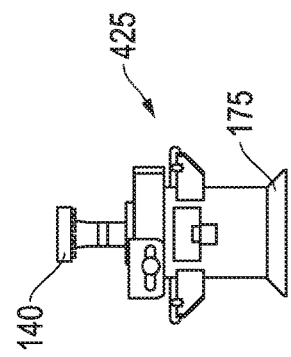
FIG. 4A
FIG. 4B
FIG. 4C
FIG. 4D

SUBSEA FLOWMETER CONNECTOR ASSEMBLY

CROSS REFERENCE TO RELATED APPLICATION(S)

This Patent Document claims priority under 35 U.S.C. § 119(e) to U.S. Provisional Application Ser. No. 62/334,870, entitled Connector with Monitor for Flexible Flowline, filed on May 11, 2016, which is incorporated herein by reference in its entirety.

BACKGROUND

Exploring, drilling and completing hydrocarbon and other wells are generally complicated, time consuming and ultimately very expensive endeavors. As a result, over the years, well architecture has become more sophisticated where appropriate in order to help enhance access to underground hydrocarbon reserves. For example, as opposed to land based oilfields accommodating wells of limited depth, it is not uncommon to find offshore oilfields with wells exceeding tens of thousands of feet in depth. Furthermore, today's hydrocarbon wells often include a host of lateral legs and fractures which stem from the main wellbore of the well toward a hydrocarbon reservoir in the formation.

In addition to the complexities of the field itself, the oilfield business itself may also be quite complex. For example, it is not uncommon for a variety of different wells at a given field to have multiple owners. This might include the circumstance where a single well is owned by multiple producers. Similarly, circumstances may involve several wells at an oilfield that are separately owned but which are produced to a single location and/or serviced by a single manifold such that the production from different wells is combined.

Multiple producer ownership allows owners to share the expenses and risk of operations. However, the arrangement introduces accounting issues. For example, where ownership is different from one producing well to the next, there is a need to couple a flowmeter to each well at some location before the production fluids are combined and produced to surface.

Conventionally, it makes sense to place a flowmeter assembly directly at the well, for example, by incorporating the flowmeter into standard Christmas tree hardware at the wellhead. The assembly may be added to the Christmas tree at surface before installation of the tree. However, for a cluster of wells, this requires that each Christmas tree of the cluster be outfitted with a substantial amount of added hardware. That is, in addition to the flowmeter itself, a sizeable landing structure is also required to accommodate the flowmeter. This usually translates into upwards of four cubic feet of volume and perhaps up to 1,000 lbs. or more being added to each tree. Thus, not only is the installation more challenging and time consuming but it is also much more costly.

In an effort to reduce costs, flowmeter assemblies may be added to a manifold that services the same cluster of wells. In this way, the trees may be installed without concern over the added costs and challenges associated with supporting individual flowmeter assemblies. Instead, this issue is transferred over to a manifold. As a practical example, this means that rather than performing six different installations with flowmeter assembly challenges, a single manifold with six different dedicated flowmeter assemblies may be installed a single time.

Unfortunately, while transferring the challenge from six trees to a single manifold may add some efficiencies, it does not actually remove the challenge altogether. Indeed, in certain respects, the challenge grows. Continuing with the example above, the challenge literally grows in terms of the sheer size increase of the manifold. Already a several thousand pound piece of equipment, the new manifold with integrated flowmeters has likely grown thousands more pounds and increased in size by 30-50%. This is because six different flowmeter assemblies, each about 4 cubic feet in size, have been added to the connection points on the manifold, one for fluid pairing to each well and tree.

If operators are able to install such a manifold, it will save time spent on installation of the Christmas trees at the wellheads. However, the challenge of such a massive installation can be daunting. For example, the sheer size of the manifold may mean that only one manifold may be installed at a time at an oilfield due to the limitations on the capacity of available installation vessels. Once more, the installation time may also be increased. Ultimately, these factors may mean that days may be added to the complete installation time. This not only costs in terms of lost time, but it also means that installation vessel expenses, generally over $250,000 in today's dollars are driven up.

As indicated, some efficiencies may be achieved through incorporating flowmeter assemblies on manifolds. However, as a practical matter, operators often opt to incorporate these assemblies on Christmas trees due to convention and to avoid the risks and challenges associated with incorporating flowmeter assemblies on manifolds.

SUMMARY

A subsea connector assembly for use with a flexible flowline is described. The assembly includes a landing end for fluidly coupling to a subsea structure at the oilfield and receiving production therefrom. The connector also includes a termination end for coupling to the flexible flowline. A flowmeter is thus, fluidly coupled to each of the landing and termination ends to monitor the flow of production through the flowmeter.

BRIEF DESCRIPTION OF THE DRAWINGS

FIG. 4A is a side view of an embodiment of a connector assembly with a separable joint.

FIG. 4B is a side view of a base of the connector assembly of FIG. 4A with a structural conduit removed therefrom at the joint.

FIG. 4C is a side view of an embodiment of a flowmeter incorporated into the subsea connector assembly of FIG. 1.

FIG. 4D is a side view of the flowmeter equipped subsea connector assembly of FIG. 1.

DETAILED DESCRIPTION

In the following description, numerous details are set forth to provide an understanding of the present disclosure.

However, it will be understood by those skilled in the art that the embodiments described may be practiced without these particular details. Further, numerous variations or modifications may be employed which remain contemplated by the embodiments as specifically described.

Embodiments are described with reference to certain subsea operations utilizing a flowmeter equipped connector assembly. For example, operations in which a cluster of wells at a seabed are each fluidly coupled to a dedicated flowmeter equipped connector assembly before production is combined at a manifold is described. In the embodiment shown, this takes place at a tree over each well with production advancing through a flexible flowline to the manifold. However, a variety of different layouts may take advantage of the unique connector assembly as detailed herein. For example, the connectors may be positioned at the manifold on the other end of the flowline or at various points in between. Indeed, so long as a unique connector of comparatively reduced profile is utilized to accommodate the flowmeter in place of incorporating the flowmeter with the underlying tree, manifold or other large scale equipment, appreciable benefit may be realized.

Figure 1:
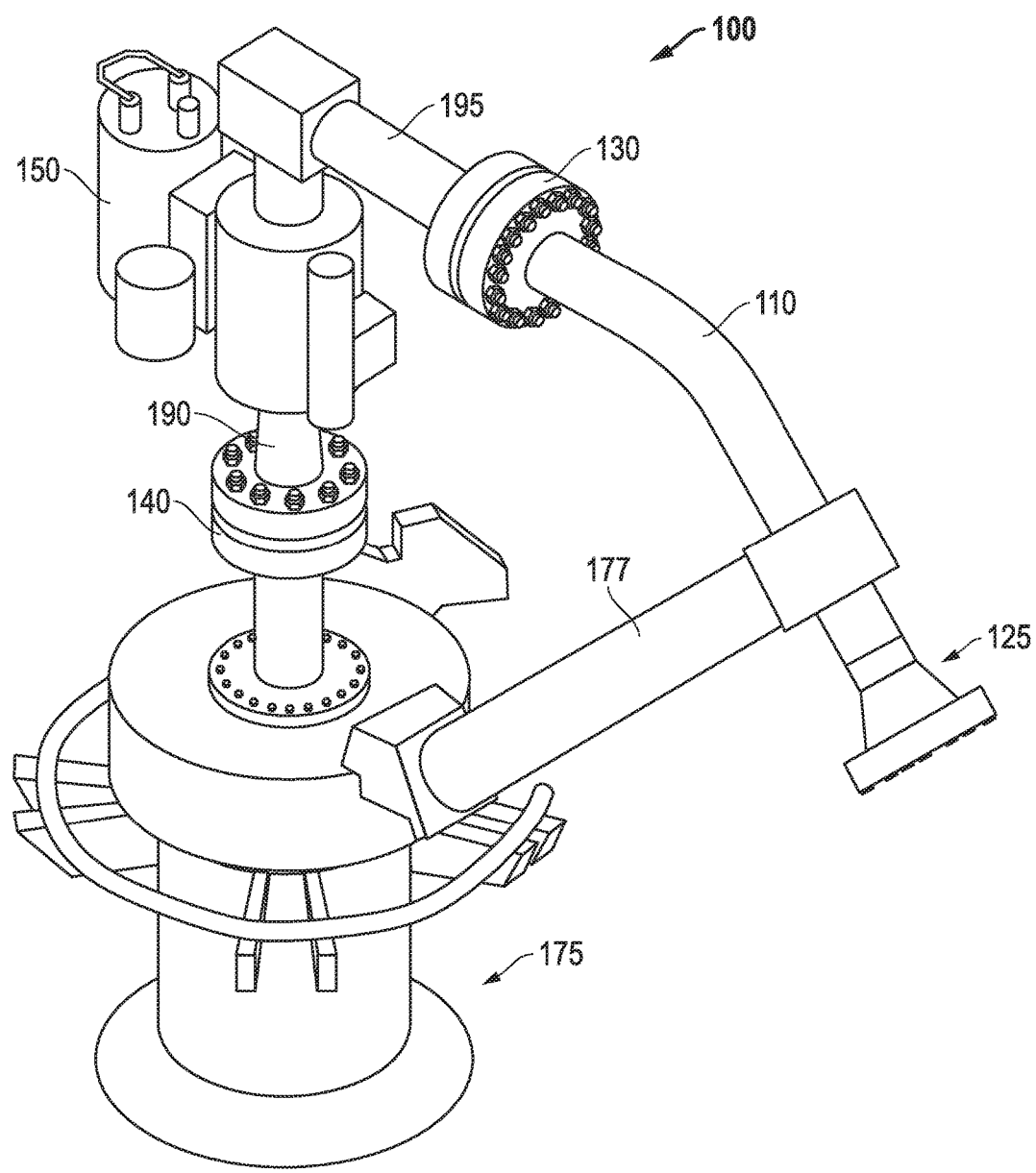
FIG. 1 is a perspective view of an embodiment of a flowmeter equipped subsea connector assembly.

Referring now to FIG. 1, a perspective view of an embodiment of a flowmeter equipped subsea connector assembly 100 is shown. The assembly 100 includes a standard base 175 for coupling to a subsea production related equipment such as a manifold (200, 250) or a Christmas tree (375, 377, 380, 390) (see FIGS. 2 and 3). So, for example, a six inch diameter fluid coupling between the base 175 and a corresponding hub at such equipment may be present through which production flows into or out from the equipment. More specifically, with added reference to FIG. 3 in particular, connector assemblies 100 are shown secured at landing hubs of the noted trees 375, 377, 380, 390. Thus, production fluid from the trees 375, 377, 380, 390 is drawn into the connector assemblies 100 at the base 175 and ultimately directed toward corresponding manifolds 200, 250. However, in other embodiments, these unique flowmeter equipped connector assemblies 100 may instead be fluidly coupled to landing hubs at the manifolds 200, 250. In either case, the production fluid from any given well below a tree 375, 377, 380, 390 is afforded the opportunity to pass through a flowmeter 150 before mixing with any other production fluid from any other well. The flowmeter 150 may be single or multi-phase depending on the type of production expected. Additionally, the flowmeter 150 may be any of a number of different configurations suitable for subsea oilfield use such as gamma ray or venturi configurations. Further, the flowmeter may acquire more detailed fluid analysis in addition to establishing flow. For example, the flowmeter may include capacity to acquire temperature measurements, constitution measurements, consistency measurements, particulate measurements, and erosion measurements.

Figure 3:
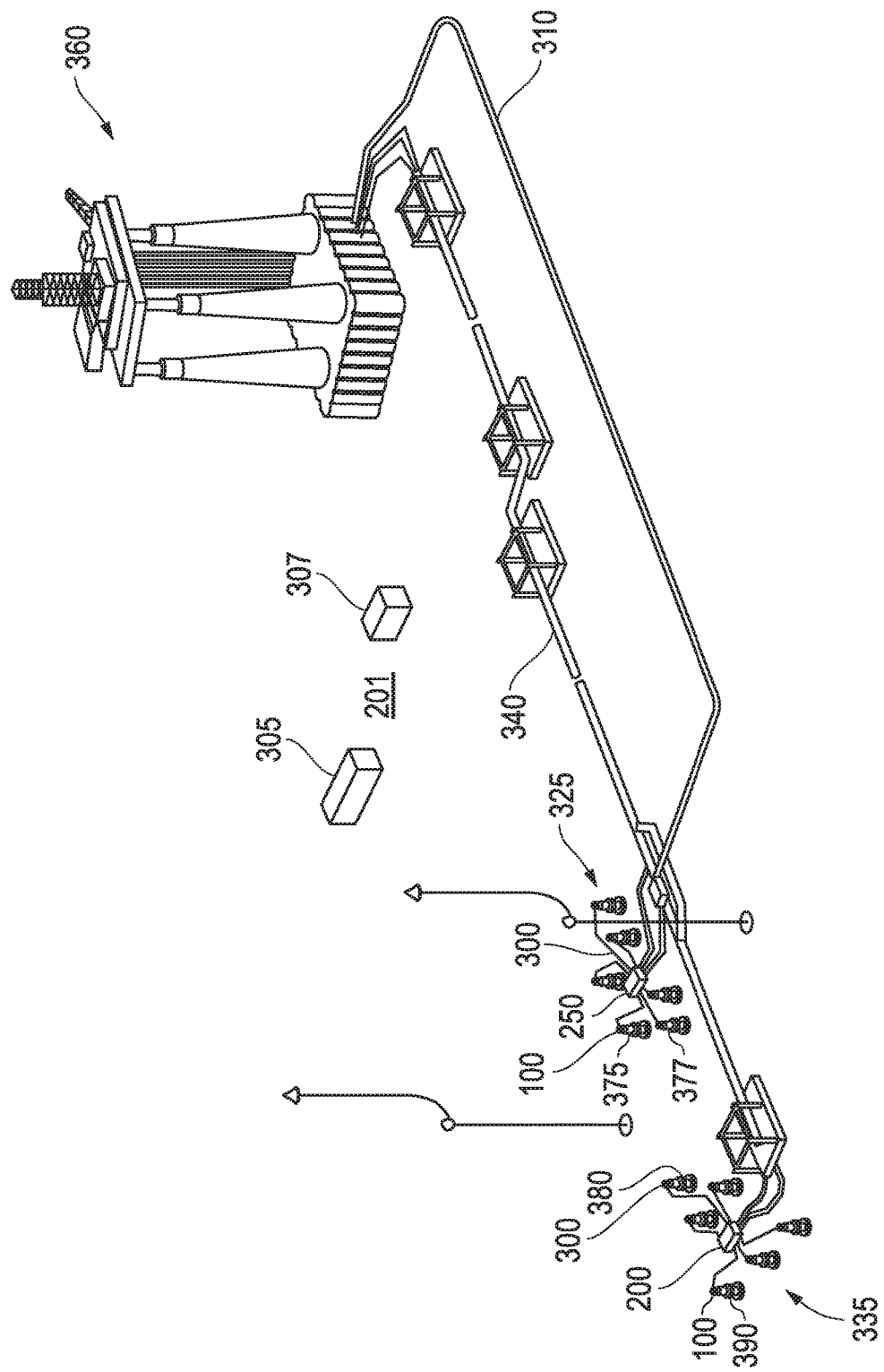
FIG. 3 is a perspective overview of a subsea oilfield accommodating embodiments of reduced profile manifolds and connector assemblies as depicted in FIG. 2.

Continuing with reference to FIG. 1, with added reference to FIG. 3, the flowmeter equipped connector assembly 100 is similar to other conventional connectors utilized to connect flexible jumpers or flowlines 300 to production equipment. Specifically, a gooseneck extension 110 with an induction bend is provided with a termination 125 for secure coupling to a flexible flowline 300. However, instead of providing the extension 110 and termination 125 immediately over the base 175, displacement thereof is illustrated with a host of intervening structure found, most notably, a flowmeter 150 is provided.

In the embodiment shown, base 140 and extension 130 flanges are provided for fluidly and securely connecting to lower 190 and upper 195 tubing hardware at either side of the noted flowmeter 150. The insertion of this intervening structure has an affect on the architecture and overall profile of the assembly 100. Therefore, in the embodiment shown, an added support 177 is provided for stabilizing the gooseneck extension 110 relative the base 175.

With added reference to FIG. 4A, in absence of the flowmeter 150 and tubing hardware 190, 195 (and support 177), the flanges 130, 140 shown in FIG. 1 may actually secure to one another at a connection joint 401. Indeed, connector assemblies 100 may be provided with a connection joint 401 to operators along with separately provided flowmeters 150 and related hardware. In this way, operators may be afforded the opportunity to splice in a flowmeter 150 as depicted depending on the assembly's intended use depending on the oilfield layout and design as discussed further below.

Figure 2:
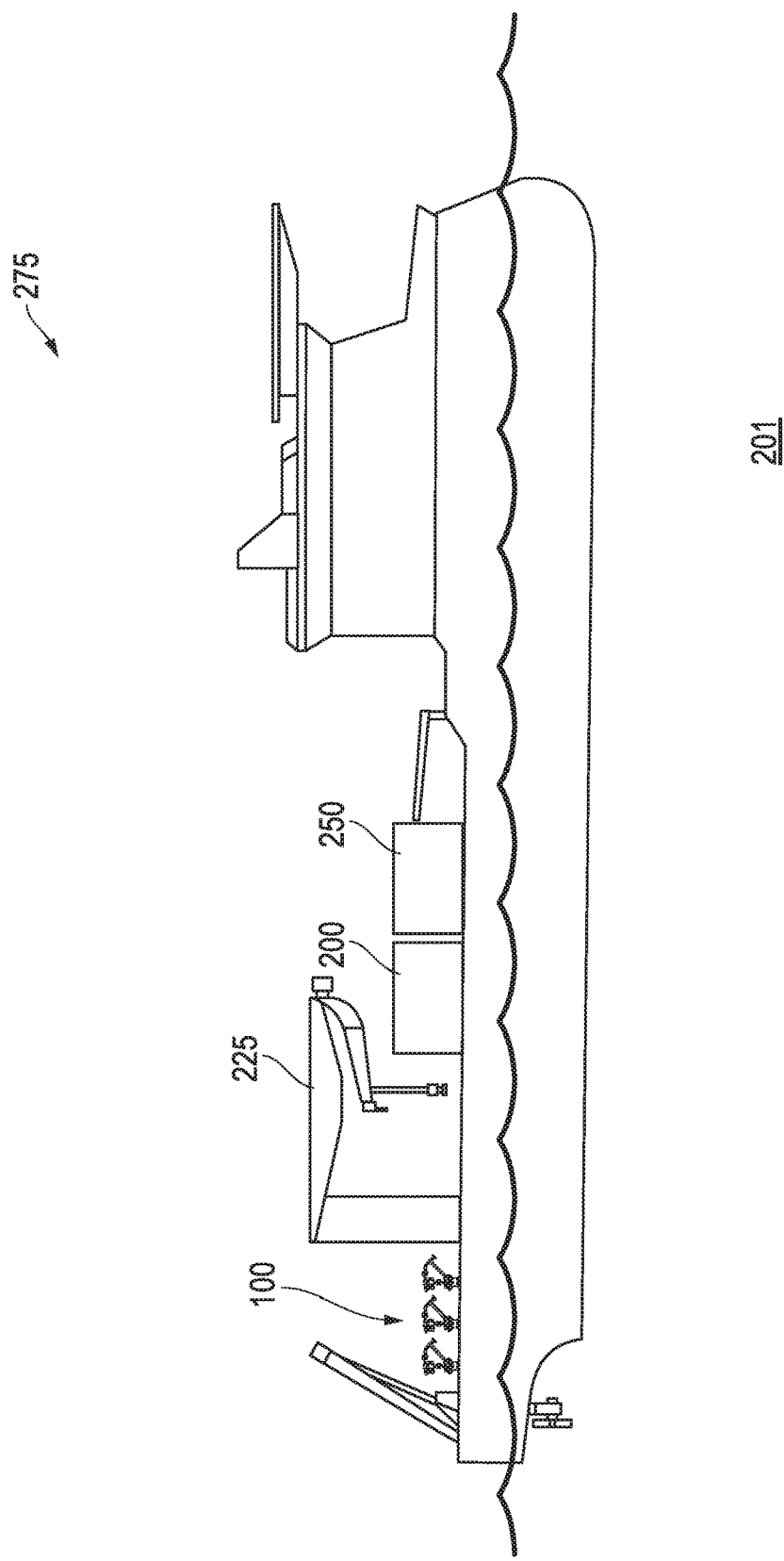
FIG. 2 is a side view of an installation vessel accommodating a host of flowmeter equipped subsea connector assemblies as depicted in FIG. 1.

Referring now to FIG. 2, a side view of an installation vessel 275 is shown over a subsea oilfield 201. The vessel 275 is shown accommodating a host of flowmeter equipped subsea connector assemblies 100 as depicted in FIG. 1. Perhaps more notably, the vessel 275 also accommodates multiple manifolds 200, 250. Together, the assemblies 100 and manifolds 200, 250 take up between about half and two thirds of the footspace required for conventional flowmeter equipped manifolds (e.g. see 305 of FIG. 3).

The above described reduction in size for the manifolds 200, 250 is achieved due to the disassociation flowmeters from the large scale manifold hardware. This is because when a flowmeter is incorporated directly into the host production structure, such as a manifold or tree, the flowmeter requires correspondingly large scale piping, frame support and other matching hardware. However, with added reference to FIG. 1, where the flowmeter 150 is disassociated from such large scale equipment, its profile may be reduced. In fact, in the embodiments herein, the flowmeter 150 is not only disassociated from large scale equipment but it is incorporated into a comparatively small connector assembly 400 that would be utilized regardless (see FIG. 4A). That is, rather than disassociating the flowmeter 150 from large scale equipment and building an entirely new smaller equipment platform for the flowmeter 150, a connector assembly 400 likely to be called for in operations already is uniquely re-configured to render the assembly 100 of FIG. 1. Due to the much smaller profile, large scale structural hardware additions are not required for this incorporation. Recall the upper 195 and lower 190 tubing hardware and support 177 of FIG. 1 are substantially sufficient to support the complete incorporation of the flowmeter 150.

Continuing with reference to FIG. 2, the added footspace available on the installation vessel 275 due to the reduction in manifold size may save a tremendous amount of time and expense. For example, even setting aside the reduction in hardware costs, more manifolds 200, 250 may be accommodated. Thus, fewer trips to the oilfield 201 may be necessary. Further, manifold deployment from a crane 225 to the seabed, as depicted in FIG. 3, may take less time due to the reduction in manifold weight. All told, in today's dollars, the disassociation of the flowmeter 150 of FIG. 1 from large scale production equipment may result in hundreds of thousands in savings.

Referring now to FIG. 3, a perspective overview of the layout for the subsea oilfield 201 referenced above is shown. In this particular layout, multiple well clusters 325, 335 are coupled to manifolds 200, 250 via connector assemblies 100. This exemplary oilfield 201 includes a conventional offshore platform 360 from which subsea operations may be directed. In this particular example, bundled water and production lines 340 and bundled electrical/hydraulic lines 310 may run along the seabed between the platform 360 and the cluster locations.

The oilfield 201 accommodates embodiments of the reduced profile manifolds 200, 250 and connector assemblies 100 as depicted in FIG. 2. More specifically, a connector assembly 100 is fluidly secured at every tree for every individual well at two different well clusters 325, 335. Recalling that each assembly 100 is outfitted with a flowmeter 150, this means that production flow from each individual well and tree (e.g. 375, 377, 380, 390) may be monitored before being combined at a manifold (e.g. 200 or 250) and then further combined at production lines 340 on the way to surface.

As a practical matter, this type of arrangement means that the production from each well may be tracked individually. This may be of benefit to operators monitoring production, for example, to track and make adjustments to operations where appropriate on a well by well basis. This also provides benefit where the wells are of differing ownership. That is, where collected production at the surface is to be allocated to different owners of different wells, it may be important to know, from an accounting perspective, which wells produced which amount of the production. Once more, this is achieved without the requirement of substantially enlarging the size of the trees (e.g. 375, 377, 380, 390) or the manifolds (e.g. 200 or 250) to accommodate incorporated flowmeters.

Continuing with reference to FIG. 3, previously installed, more conventional manifolds 305, 307 with incorporated flowmeters are also shown at the oilfield 201. With added reference to FIG. 2, it is unlikely that these manifolds 305, 307 were able to be accommodated at the installation vessel 275 simultaneously. As a result, multiple trips to the oilfield 201 and longer installation times for each manifold 305, 307 were the likely result. The same type of increased size and profile issues would result if the flowmeters were instead incorporated into conventional trees. However, by associating flowmeters (e.g. 150 of FIG. 1) with flexible line connector assemblies 100, such large scale profile and weight issues may be addressed through a type of equipment likely to be employed at the oilfield 201 anyway. That is, where flexible line 300 is to be used between trees 375, 377, 380, 390 and manifolds 200, 250, some form of connector will be utilized even in absence of flowmetering. Thus, unique benefit is realized in reconfiguring this particular equipment into such a small scale assembly 100 (also see FIG. 1).

It is worth noting that the assembly 100 is depicted at the trees 375, 377, 380, 390 in the embodiment shown. However, in other embodiments, the flowmeter equipped connector assembly 100 may instead be secured at the other end of the flexible line 300 (e.g. at the manifold 200, 250). By the same token, the assemblies 100 may work effectively through either vertical or horizontal connection. Furthermore, in other embodiments utilizing a different layout, the assemblies 100 may be secured to a hub at a pipeline, a pipeline end termination (PLET), a pipeline end manifold (PLEM) or other suitable subsea or even surface production equipment structure. So long as flowmetering is able to intervene through a connector 100 in advance of combining production from differing wells, appreciable benefit may be realized.

Referring now to FIG. 4A, a side view of an embodiment of a connector assembly 400 is shown with a separable joint 401. This connector assembly 400 may be provided standard. For example, in the embodiment of FIG. 3 where the flowmeter equipped connector assembly 100 is utilized at Christmas trees 375, 377, 380, 390, the connector assembly 400 of FIG. 4A may be utilized at the manifolds 200, 250. Of course, as described below, this same assembly 400 may be reconfigured into the assembly 100 of FIG. 1.

Referring now to FIG. 4B, a side view of a lower portion 425 of the connector assembly of FIG. 4A is shown with the gooseneck extension 110 removed from the base 175 at the joint 401. Specifically, the base flange 140 is separated from the extension flange 130 and exposed for being fluidly coupled to other equipment. Specifically, as shown in FIG. 4C, a side view of an embodiment of a flowmeter 150 is shown with lower 190 and upper 195 tubing hardware for incorporation into the assembly 100 of FIG. 4D. As indicated above, the flowmeter 150 may be of a gamma ray, venturi or other suitable type. Additionally, the flowmeter 150 may constitute housing substantial enough to include added processing capability for the production fluid. For example, the housing may include any of a pump, a process fluid turbine, a gas injection apparatus, a steam injection apparatus, a chemical injection apparatus, a chemical treatment apparatus, a pressure boosting apparatus, a water electrolysis apparatus, a materials injection apparatus, a gas separation apparatus, a water separation apparatus, a sand/debris separation apparatus and a hydrocarbon separation apparatus.

Referring now to FIG. 4D, a side view of the fully assembled flowmeter equipped subsea connector assembly 100 of FIG. 1 is shown. The flowmeter 150 has been secured to the base flange 140 of FIG. 4B via the lower tubing hardware 190. Similarly, the gooseneck extension 110 has been secured at the upper tubing hardware 195 and a structural support 177 has been added between the base 175 and the extension 110 to complete the assembly 100.

Figure 5:
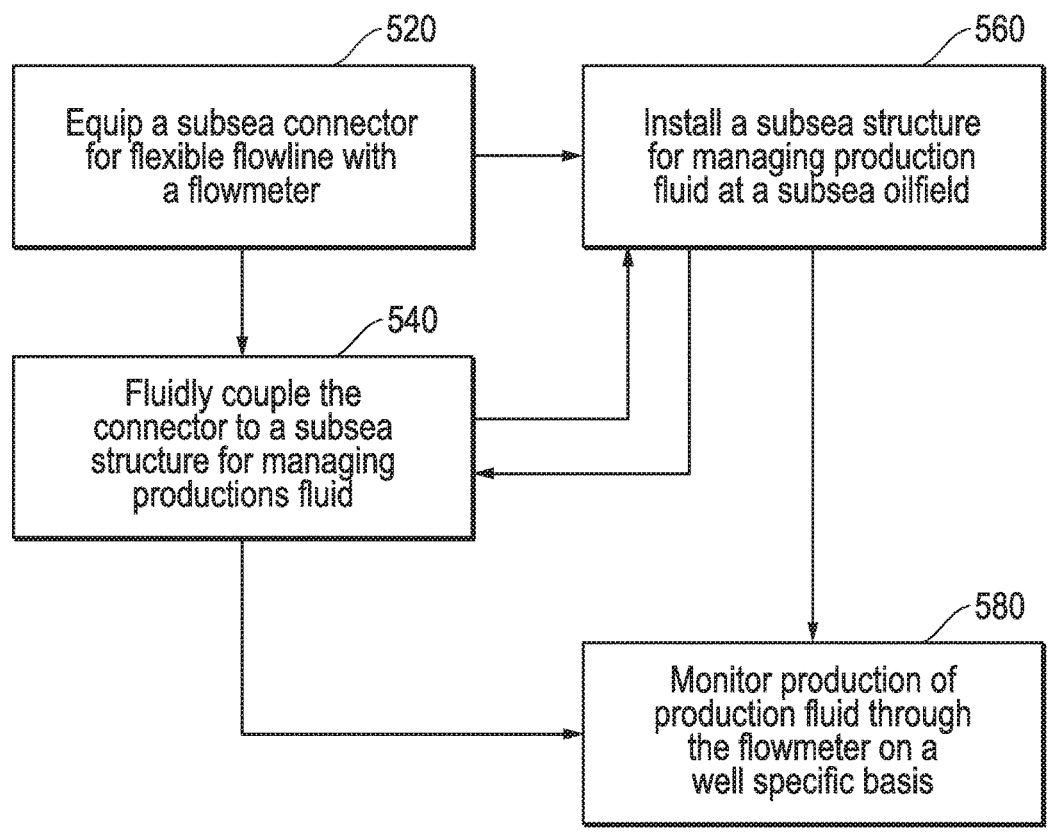
FIG. 5 is a flow-chart summarizing an embodiment of assembling and employing an embodiment of a flowmeter equipped subsea connector assembly at a subsea oilfield.

Referring now to FIG. 5, a flow-chart is shown summarizing an embodiment of assembling and employing a flowmeter equipped subsea connector assembly at a subsea oilfield. Specifically, once the connector is equipped with a flowmeter as indicated at 520, it may be fluidly coupled to a subsea structure for managing production fluid as indicated at 540. So, for example, even before manifold or tree structures are deployed from an installation vessel, the assemblies may be manually coupled to the structures at a time of greater manual access. The structure may then be installed at the seabed (see 560). Of course, this may not always be called for or even possible, for example where the structure has already been installed and flowmeter capacity is sought at a later time, in which case, the addition of the flowmeter equipped connector may take place subsea (see 540).

Whatever the sequence of installation, the use of the flowmeter equipped connector allows for the monitoring of production through the structure as noted at 580. More specifically, this monitoring takes place on a well by well or well specific basis prior to the combining of the production with production from any other well. Thus, in addition to efficiencies detailed hereinabove a reliable manner of production accounting takes place for each specific well.

Embodiments described above provide a new and unique form of subsea hardware that disassociates flowmeter functionality from large scale equipment that manages well production on a well by well or well specific basis. This allows for flowmeter functionality without dramatically increasing the size of manifolds, Christmas trees and other such equipment to accommodate a flowmeter. Thus, dramatic savings may be realized in equipment expenses as well as costs in terms of installation time.

The preceding description has been presented with reference to presently preferred embodiments. Persons skilled in the art and technology to which these embodiments pertain will appreciate that alterations and changes in the described structures and methods of operation may be practiced without meaningfully departing from the principle, and scope of these embodiments. Furthermore, the foregoing description should not be read as pertaining only to the precise structures described and shown in the accompanying drawings, but rather should be read as consistent with and as support for the following claims, which are to have their fullest and fairest scope.

We claim:

1. A subsea connector assembly for use at a subsea oilfield below a sea surface, the assembly comprising:
   a landing base for fluidly coupling to a subsea production managing hardware at the oilfield to receive production therefrom;
   a gooseneck extension with a termination displaced from over the base for fluidly coupling to a flexible flowline to accommodate the production toward the surface; and
   a flowmeter fluidly coupled to each of the base and the gooseneck extension for monitoring a flow of the production therethrough; and
   a support with a first end coupled to the gooseneck extension and a second end coupled to the base.

2. The subsea connector assembly of claim 1 wherein the flowmeter is one of a single phase flowmeter, a multi-phase flowmeter, a gamma ray flowmeter and a venturi flowmeter.

3. The subsea connector assembly of claim 1 wherein the flowmeter includes a housing configured to support production fluid processing.

4. The subsea connector assembly of claim 1 wherein the flowmeter is located at a separable joint between the base and the extension.

5. An oilfield system comprising:
   a first production managing structure;
   a second production managing structure;
   a flexible flowline for carrying production from the first structure to the second; and
   a connector assembly with a base supporting a flowmeter with a gooseneck extension emerging therefrom for fluidly coupling an end of the flexible flowline to one of the first and second production managing structures at a termination displaced from over the base, the assembly including a support with a first end coupled to the extension and a second end coupled to the base.

6. The oilfield system of claim 5 wherein the production managing structures are selected from a group consisting of a manifold, a Christmas tree, a pipeline, a pipeline end termination and a pipeline end manifold.

7. The oilfield system of claim 6 wherein the first production managing structure is a Christmas tree for directing the production from a specific well over the flexible flowline to the second production managing structure, the second production managing structure being a manifold for combining the production from the specific well with production from other wells.

8. The oilfield system of claim 5 wherein the end of the flexible flowline is a first end and the connector assembly is coupled to the first production managing structure, the system further comprising another connector assembly coupled to a second end of the flexible flowline for fluid coupling to the second production managing structure.

9. The oilfield system of claim 8 wherein the other connector assembly includes one of a flowmeter and a separable joint to accommodate a flowmeter.

10. A method of monitoring production fluid from a specific well in a group of wells at a seabed, the method comprising:
    installing a connector assembly with a base supporting a flowmeter with a gooseneck extension emerging therefrom at a production managing structure to fluidly couple a flexible flowline to the structure via the extension at a termination thereof displaced from over the base, the assembly including a support with a first end coupled to the extension and a second end coupled to the base, the flexible flowline being dedicated to the specific well; and
    flowing production fluid from the specific well and through the flowmeter of the assembly before combining with production fluid from other wells of the group.

11. The method of claim 10 further comprising measuring the production fluid through the flowmeter for one of temperature, constitution, consistency, particulate and erosion during the flowing.

12. The method of claim 10 wherein the flowmeter is incorporated into a housing that additionally supports fluid processing of the production fluid.

13. The method of claim 12 wherein the additional fluid processing is one of pumping, gas injection, steam injection, chemical injection, chemical treatment, pressure boosting, water electrolysis, materials injection, gas separation, water separation, sand/debris separation, hydrocarbon separation and a processing with a fluid turbine.

14. The method of claim 10 wherein the production managing structure is one of a manifold and a Christmas tree at a well, the flowing of the production fluid comprising flowing production fluid from the Christmas tree to the manifold over the flexible flowline.

15. The method of claim 14 wherein the combining takes place at the manifold, the method further comprising directing the combined production fluid to surface away from the seabed.

16. The method of claim 10 wherein the flowmeter is one of a single phase flowmeter, a multi-phase flowmeter, a gamma ray flowmeter and a veturi flowmeter.

17. The method of claim 10 wherein the production managing structure is selected from a group consisting of a manifold, a Christmas tree, a pipeline, a pipeline end termination and a pipeline end manifold.

* * * * *